(12) United States Patent
Djabarov

(10) Patent No.: US 8,595,230 B1
(45) Date of Patent: Nov. 26, 2013

(54) INTELLIGENT IDENTIFICATION OF FORM FIELD ELEMENTS

(75) Inventor: Gueorgui Djabarov, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/534,574

(22) Filed: Jun. 27, 2012

Related U.S. Application Data

(63) Continuation of application No. 12/205,376, filed on Sep. 5, 2008, now Pat. No. 8,214,362.

(60) Provisional application No. 60/970,756, filed on Sep. 7, 2007.

(51) Int. Cl.
*G06F 17/00* (2006.01)
*G06F 17/24* (2006.01)

(52) U.S. Cl.
CPC ................... *G06F 17/243* (2013.01)
USPC .......... 707/736; 707/713; 707/758; 707/767; 715/224

(58) Field of Classification Search
USPC ............ 707/1, 3, 6, 104, 708, 713, 736, 758, 707/767, 782; 715/224
See application file for complete search history.

(56) References Cited

U.S. PATENT DOCUMENTS

| | | | |
|---|---|---|---|
| 5,666,502 A | 9/1997 | Capps | |
| 6,820,075 B2 | 11/2004 | Shanahan et al. | |
| 7,185,272 B2 | 2/2007 | Pearce et al. | |
| 7,216,292 B1 | 5/2007 | Snapper et al. | |
| 7,426,496 B2 * | 9/2008 | Kristjansson | 706/10 |
| 7,500,178 B1 | 3/2009 | O'Donnell | |
| 7,596,545 B1 * | 9/2009 | Lee et al. | 707/999.002 |
| 7,660,779 B2 | 2/2010 | Goodman et al. | |
| 7,660,855 B2 * | 2/2010 | Arning et al. | 709/206 |
| 7,685,144 B1 | 3/2010 | Katragadda | |
| 7,779,345 B2 * | 8/2010 | Topalov et al. | 715/224 |
| 7,962,845 B2 * | 6/2011 | Maxwell et al. | 715/224 |
| 8,010,610 B2 * | 8/2011 | Bumiller | 709/206 |
| 8,214,362 B1 | 7/2012 | Djabarov | |
| 8,234,561 B1 * | 7/2012 | Bourdev | 715/224 |
| 2006/0168509 A1 | 7/2006 | Boss et al. | |
| 2008/0098000 A1 | 4/2008 | Koretz et al. | |
| 2008/0172598 A1 | 7/2008 | Jacobsen et al. | |
| 2008/0313529 A1 * | 12/2008 | Gwozdz et al. | 715/224 |

* cited by examiner

*Primary Examiner* — Dangelino Gortayo
(74) *Attorney, Agent, or Firm* — Harrity & Harrity, LLP

(57) ABSTRACT

A system and method may assist in accurately inserting user data into a form document. An attribute may be received from a user, where the attribute is associated with an attribute name. A document may be presented including a form field element having an identifier. User information may be received into the form field element. It may be determined whether the user information matches the attribute. If so, the identifier associated with the form field element is mapped to the attribute name and the mapping is stored. Upon subsequent display of the form document, user data associated with the mapped attributed name may be inserted into the form field element based on the mapping.

20 Claims, 10 Drawing Sheets

FIG. 7

| Attribute value | Attribute name |
|---|---|
| John | first name |
| Doe | last name |
| jdoe@gmail.com | email address |
| 703-555-1234 | home phone number |
| 703-555-1235 | work phone number |
| 703-555-1236 | mobile phone number |
| 1435 Anywhere Lane | street address line 1 |
| Apt. 202 | street address line 2 |
| Fairfax | city |
| VA | state |
| 22030 | zip code |

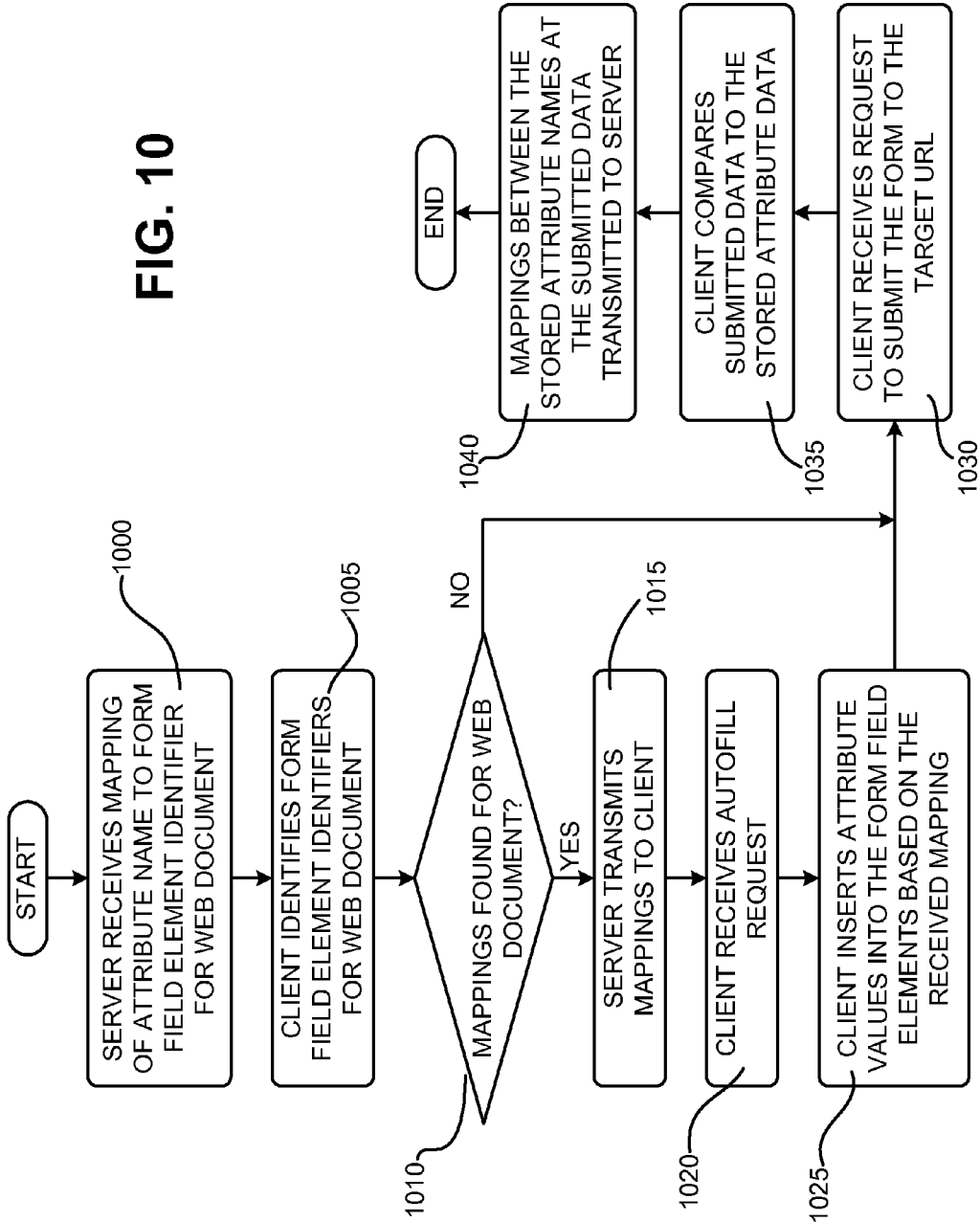

INTELLIGENT IDENTIFICATION OF FORM FIELD ELEMENTS

RELATED APPLICATIONS

This application claims priority from U.S. Provisional Application Ser. No. 60/970,756, filed Sep. 7, 2007, entitled "INTELLIGENT IDENTIFICATION OF FORM FIELD ELEMENTS," the contents of which are incorporated by reference.

BACKGROUND

1. Field of the Invention

Implementations relate generally to web based information forms and, more particularly, to accurately identifying form field elements for automatic completion.

2. Description of Related Art

Web based forms are commonly used to facilitate the receipt of information from users. In many instances, the information requested in such forms is repeated in various web documents. Existing tools enable the rapid entry or filling of form fields, by storing user data and inserting the stored user data into appropriate form fields, when identified. Known tools insert stored data into a web form based on predefined web form field identifiers. Such tools match the predefined form field identifiers with identifiers in the web documents and, when a match occurs automatically insert the user data corresponding to the identifier into the appropriate field. Unfortunately, inconsistent web document authoring or other disconnects may reduce the tool's ability to accurately identify the form field elements in the web document. Absent an accurate identification of the form field elements, the accuracy with which information completion may be made is significantly hindered.

SUMMARY

According to one aspect, a method is provided includes receiving an attribute from a user, where the attribute is associated with an attribute name; presenting a document including a form field element having an identifier; receiving user information into the form field element; determining whether the user information matches the attribute; mapping the identifier to the attribute name when it is determined that the user information matches the attribute; and storing the mapping.

According to another aspect, a system includes means for receiving data elements from a user; means for storing the data elements; means for presenting a form document having a form field element therein; means for determining whether the form field element is associated with at least one of the received data elements based on information previously submitted with the form document; and means for inserting the at least one data element in the form field element when it is determined that the form field element is associated with at least one of the received data elements.

According to a further aspect, a method is provided. The method, performed by a device, may include storing a mapping of form field elements associated with a web document to user data types; receiving a request for the mapping from a client; and transmitting the stored mapping to the client for use in mapping user data associated with the user data types to form field elements associated with the web document.

According to yet another aspect a computer-readable medium that stores instructions executable by a client device is provided. The computer-readable medium may include instructions for causing the client device to store a table of user attributes based on attribute name; instructions for causing the client device to present a document including a form having form field elements thereon; instructions for causing the client device to request a mapping of attribute names to form field elements from a server device remote from the client device; and instructions for causing the client device to receive the mapping from the server device; and instructions for causing the client device to insert user attributes into the form field elements based on the received mapping.

According to still another aspect, a method is provided for automatically filling in forms in a web document, including transmitting an identifier that uniquely identifies a first form in the web document to a remote server; receiving, in response to the transmitting, an indicating of a type of data being requested by the first form; and filling in the first form based on the indication of the type of data.

BRIEF DESCRIPTION OF THE DRAWINGS

The accompanying drawings, which are incorporated in and constitute a part of this specification, illustrate an embodiment of the invention and, together with the description, explain the invention. In the drawings.

FIG. 7 is a table illustrating an exemplary listing of user information and associated attribute names.

FIG. 10 is a flowchart of an exemplary process for implementing a networked AutoFill feature.

DETAILED DESCRIPTION

The following detailed description of the invention refers to the accompanying drawings. The same reference numbers in different drawings may identify the same or similar elements. Also, the following detailed description does not limit the invention.

Overview

As described herein, form elements in a web document may be accurately identified and centrally stored once identified. When the form element is subsequently displayed to a user, the centrally stored identification may be used to enable accurate insertion of previously stored user information into the web document.

Figure 1:
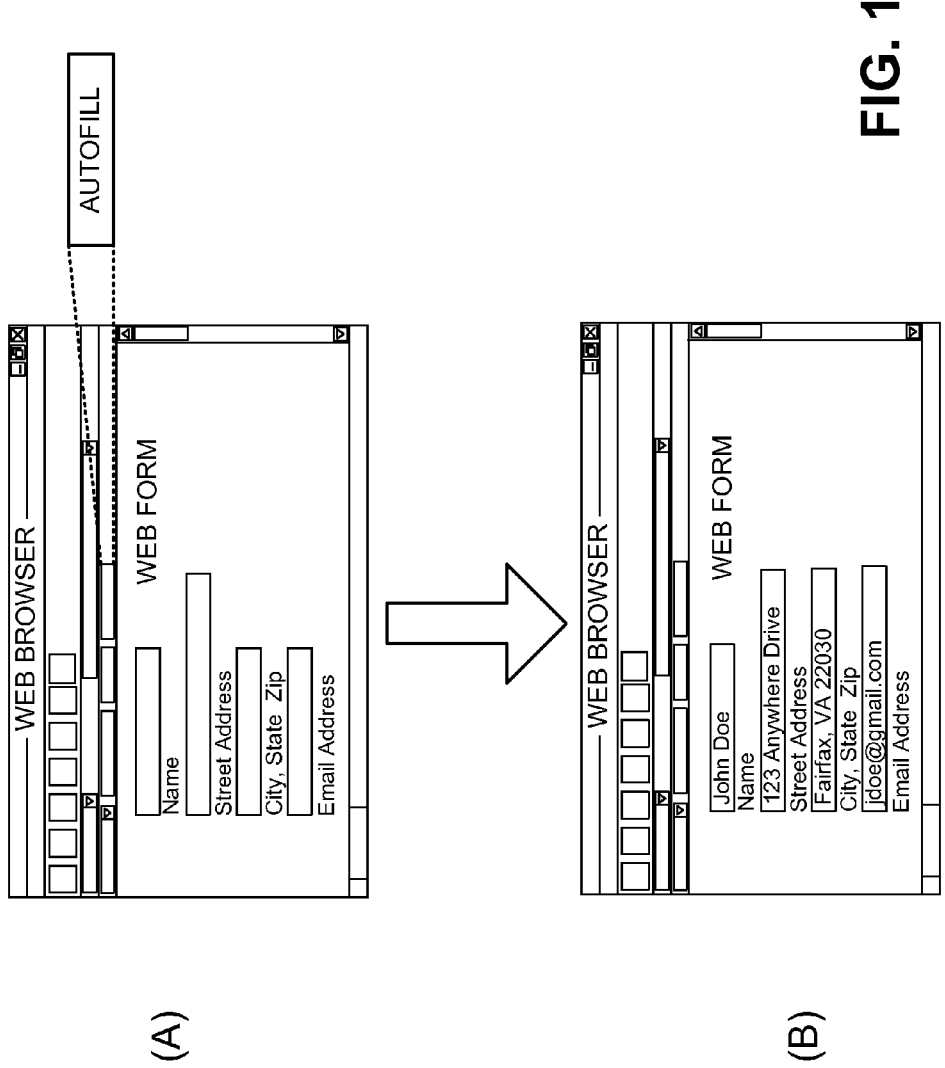
FIG. 1 is an exemplary diagram illustrating one aspect of the invention.

FIG. 1 is a diagram illustrating one exemplary implementation. As shown at (A), a user may access a web document having a web form, using a web browser. As also shown at (A), the web browser includes functionality associated with an AutoFill feature. The AutoFill feature may permit the user to insert previously saved information into web document having identifiable form elements thereon. As shown at (B), upon identification of form elements, the AutoFill feature may insert previously saved information relating to those identified elements into the web document, thereby eliminating the need for the user to manually insert this information. As will be described in additional detail below, the present invention is directed toward methods and systems for enabling accurate identification of the web elements, thereby increasing the accuracy and quantity of the information inserted.

A "document," as the term is used herein, is to be broadly interpreted to include any machine-readable and machine-storable work product. A document may include, for example, an e-mail, a web site, a file, a combination of files, one or more files with embedded links to other files, a news group posting, a blog, a business listing, an electronic version of printed text, a web advertisement, etc. In the context of the Internet, a common document is a web page. Documents often include textual information and may include embedded information (such as meta information, images, hyperlinks, etc.) and/or embedded instructions (such as Javascript, etc.). A "link," as the term is used herein, is to be broadly interpreted to include any reference to/from a document from/to another document or another part of the same document.

Exemplary Network Configuration

Figure 2:
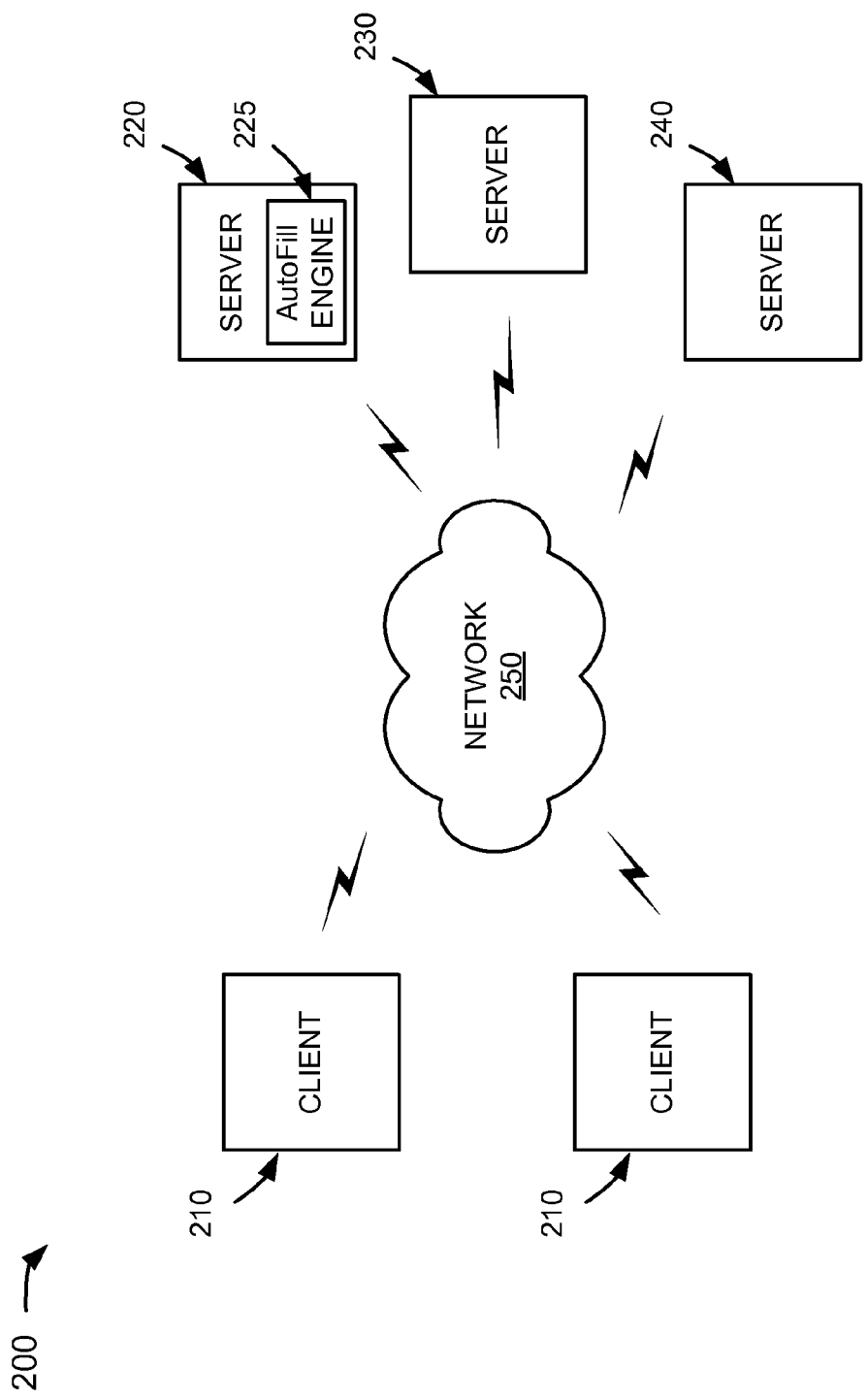
FIG. 2 is an exemplary diagram of a network in which systems and methods consistent with aspects of the invention may be implemented.

FIG. 2 is an exemplary diagram of a network 200 in which systems and methods consistent with aspects of the invention may be implemented. Network 200 may include multiple clients 210 connected to multiple servers 220-240 via a network 250. Two clients 210 and three servers 220-240 have been illustrated as connected to network 250 for simplicity. In practice, there may be more or fewer clients and servers. Also, in some instances, a client may perform a function of a server and a server may perform a function of a client.

Clients 210 may include client entities. An entity may be defined as a device, such as a personal computer, a wireless telephone, a personal digital assistant (PDA), a lap top, or another type of computation or communication device, a thread or process running on one of these devices, and/or an object executable by one of these devices. In other aspects, servers 220-240 may include server entities that gather, process, search, and/or maintain documents.

In one implementation, server 220 may include an AutoFill engine 225 usable by clients 210. As will be described in additional detail below, AutoFill engine 225 may receive user mappings of web form elements to user data types to facilitate accurate insertion of user data into web form elements.

While servers 220-240 are shown as separate entities, it may be possible for one or more of servers 220-240 to perform one or more of the functions of another one or more of servers 220-240. For example, it may be possible that two or more of servers 220-240 are implemented as a single server. It may also be possible for a single one of servers 220-240 to be implemented as two or more separate (and possibly distributed) devices.

Network 250 may include a local area network (LAN), a wide area network (WAN), a telephone network, such as the Public Switched Telephone Network (PSTN), an intranet, the Internet, or a combination of networks. Clients 210 and servers 220-240 may connect to network 250 via wired, wireless, and/or optical connections.

Exemplary Client/Server Architecture

Figure 3:
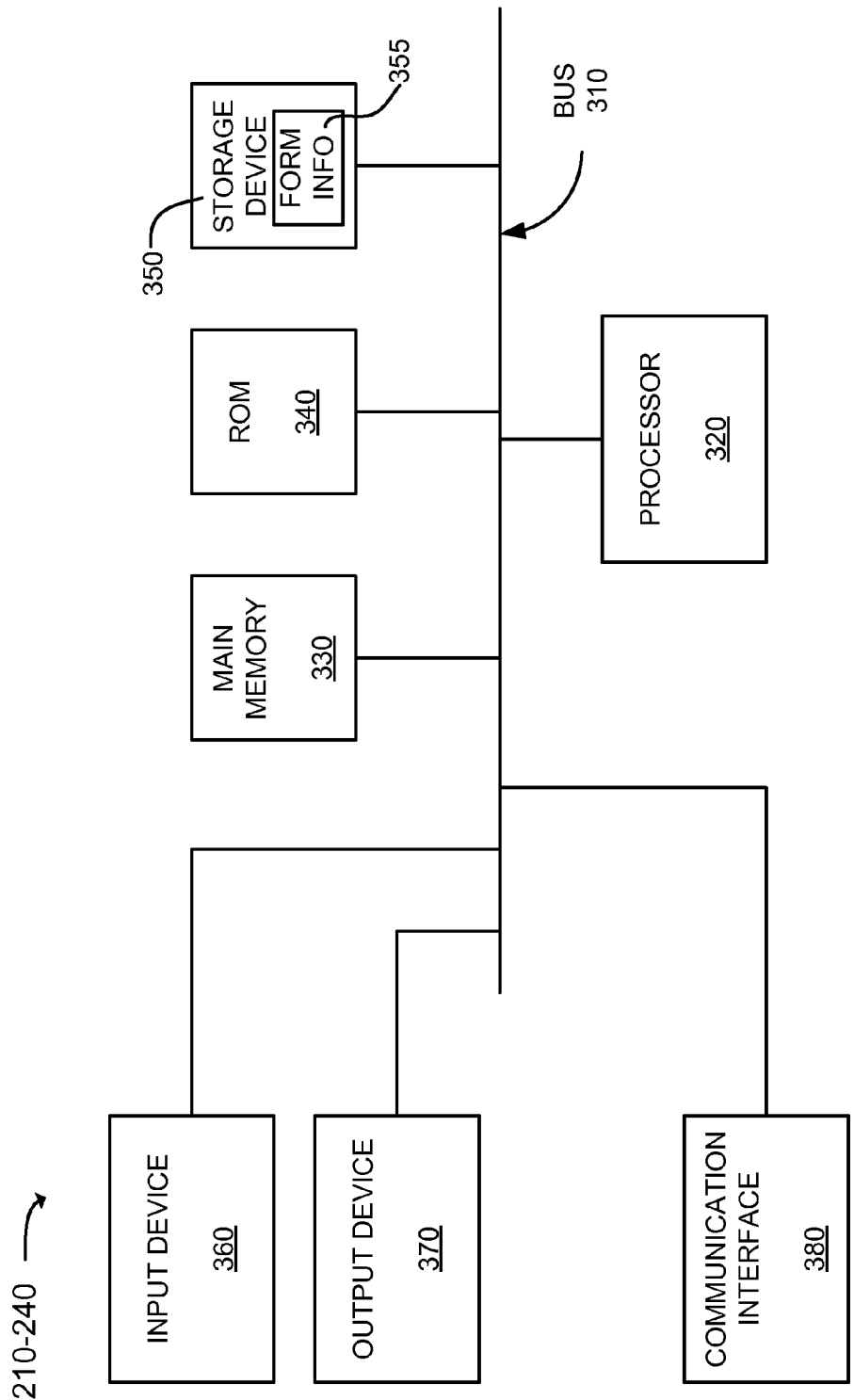
FIG. 3 is an exemplary diagram of a client or server of FIG. 2.

FIG. 3 is an exemplary diagram of a client or server entity (hereinafter called "client/server entity"), which may correspond to one or more of clients 210 and/or servers 220-240. The client/server entity may include a bus 310, a processor 320, a main memory 330, a read only memory (ROM) 340, a storage device 350, an input device 360, an output device 370, and a communication interface 380. Bus 310 may include a path that permits communication among the elements of the client/server entity.

Processor 320 may include a processor, microprocessor, or processing logic that may interpret and execute instructions. Main memory 330 may include a random access memory (RAM) or another type of dynamic storage device that may store information and instructions for execution by processor 320. ROM 340 may include a ROM device or another type of static storage device that may store static information and instructions for use by processor 320. Storage device 350 may include a magnetic and/or optical recording medium and its corresponding drive. Additionally, storage device 350 may include forms information storage area 355 for receiving and maintaining user data for form submission in accordance with the AutoFill feature.

Input device 360 may include a mechanism that permits an operator to input information to the client/server entity, such as a keyboard, a mouse, a pen, voice recognition and/or biometric mechanisms, etc. Output device 370 may include a mechanism that outputs information to the operator, including a display, a printer, a speaker, etc. Communication interface 380 may include any transceiver-like mechanism that enables the client/server entity to communicate with other devices and/or systems. For example, communication interface 380 may include mechanisms for communicating with another device or system via a network, such as network 250.

As will be described in detail below, the client/server entity may perform certain document processing-related operations. The client/server entity may perform these operations in response to processor 320 executing software instructions contained in a computer-readable medium, such as memory 330. A computer-readable medium may be defined as a physical or logical memory device and/or carrier wave.

The software instructions may be read into memory 330 from another computer-readable medium, such as data storage device 350, or from another device via communication interface 380. The software instructions contained in memory 330 may cause processor 320 to perform processes that will be described later. Alternatively, hardwired circuitry may be used in place of or in combination with software instructions to implement processes in various aspects of the invention. Thus, implementations of the invention are not limited to any specific combination of hardware circuitry and software.

Exemplary Computer-Readable Medium

Figure 4:
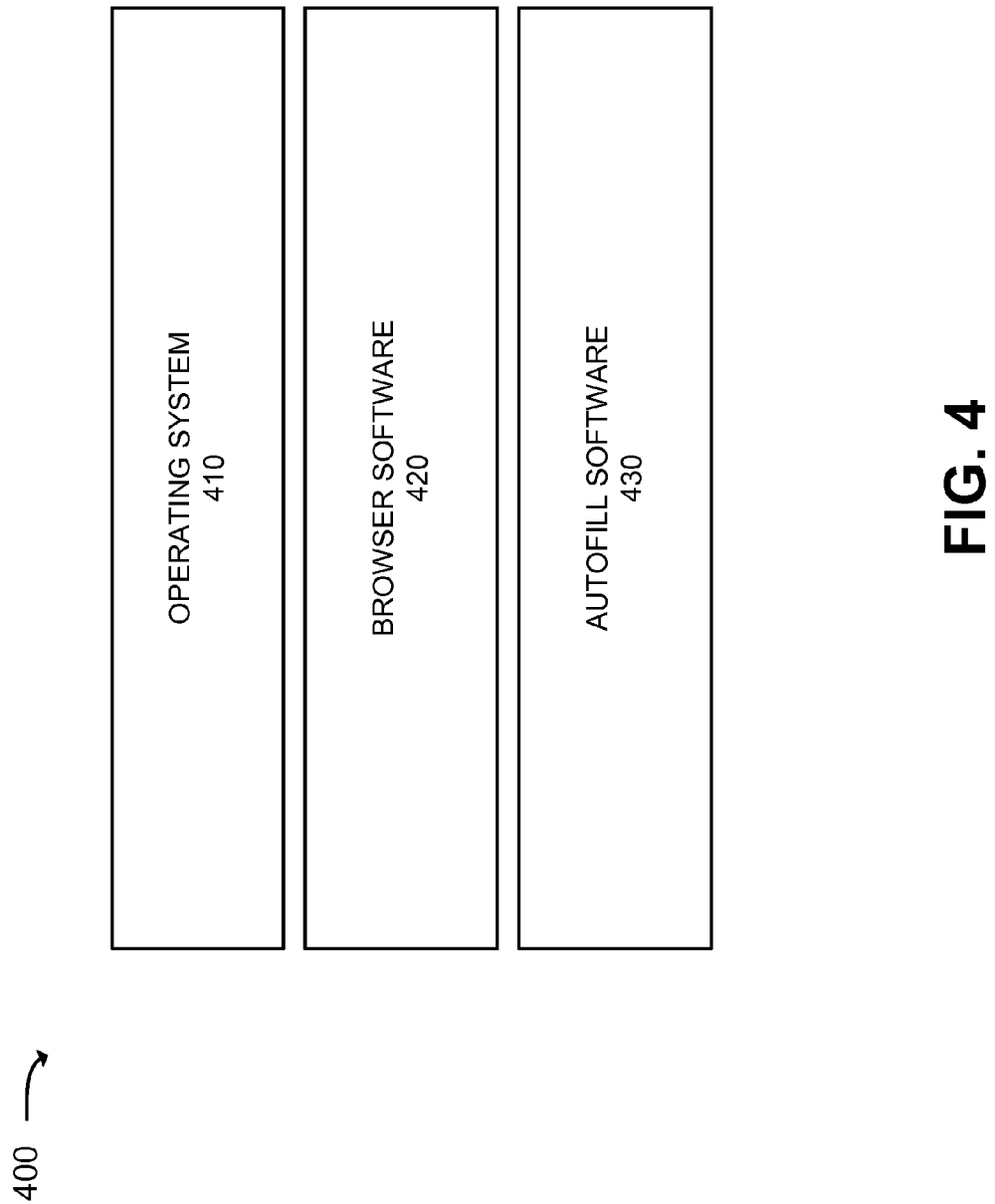
FIG. 4 is a diagram of a portion of an exemplary computer-readable medium that may be used by a client of FIG. 2.

FIG. 4 is a diagram of a portion of an exemplary computer-readable medium 400 that may be used by a client 210. In one implementation, computer-readable medium 400 may correspond to memory 330 of a client 210. The portion of computer-readable medium 400 illustrated in FIG. 4 may include an operating system 410, browser software 420, and AutoFill software 430.

More specifically, operating system 410 may include operating system software, such as the Microsoft Windows®, Unix, or Linux operating systems. Browser software 420 may include software associated with a web browser, such as the Microsoft® Internet Explorer, Netscape Navigator, or Mozilla® Firefox® browser.

AutoFill software 430 may include a plug-in, an applet, a dynamic link library (DLL), a bookmark, or a similar executable object or process. Client 210 may obtain the executable object or process from server 220 or from a third party, such as a third party server, disk, tape, network, CD-ROM, etc. Alternatively, the executable object or process may be pre-installed on client 210.

Additionally, AutoFill software 430 may cause a user interface object, such as a toolbar button, a menu item, a link, a frame, etc., to be presented within a web browser window. The user interface object may operate in conjunction with the web browser. In another implementation, the user interface object may be an integrated part of the web browser. In this latter implementation, the web browser may perform the functions of the user interface object. In yet another implementation, the user interface object is a process separate from the web browser. For example, the user interface object may interface between the web browser and network 250.

A forms monitoring aspect of AutoFill software 430 may be automatically activated upon initiation of the web browser. In this embodiment, monitoring of web documents for "fillable" form elements may be performed automatically, while actual insertion of forms information into the identified form elements may be activated when instructed by a user. In an alternative implementation, AutoFill software 430 may be wholly automated in both monitoring and insertion capabilities when instructed by a user. In either case, the AutoFill feature may take the form of a user interface object, examples of which are described below.

Exemplary User Interface

Figure 5:
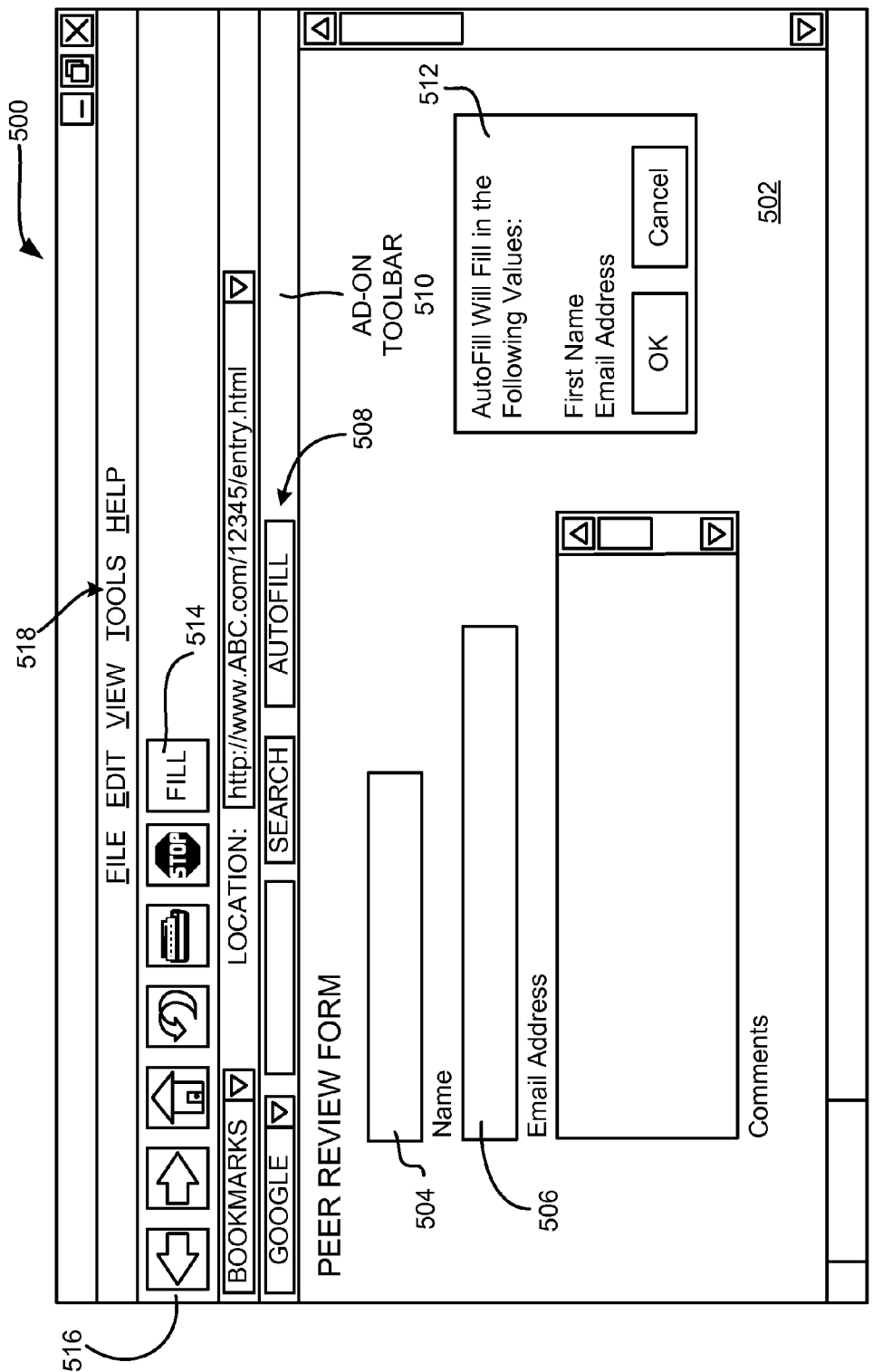
FIG. 5 is an exemplary diagram of a graphical user interface that illustrates various implementations of intelligent AutoFill feature.

FIG. 5 is an exemplary diagram of a graphical user interface 500 that illustrates various implementations of the intelligent AutoFill feature. Graphical user interface 500 may, for example, correspond to a web browser window that currently displays a document 502 having a number of fillable form elements 504 and 506.

According to one implementation, the AutoFill feature may be implemented as a toolbar option 508 of an add-on toolbar 510. Add-on toolbar 510 may include one or more search boxes, software buttons, and/or menu elements selectable by a user to initiate different functions by add-on toolbar 510. In this case, a user may activate one or more functions of the AutoFill feature by selecting (e.g., clicking on) toolbar button 508. According to another implementation, additional features of the AutoFill feature may be selected by "key+clicking" toolbar button 508 (e.g., by clicking or selecting toolbar button 508 while simultaneously depressing one or more keys on a keyboard). For example, by shift+clicking toolbar button 508, a Confirm AutoFill box 512 including a listing of "to be filled" elements may be displayed to the user for confirmation prior to insertion in document 502.

In another implementation, the AutoFill feature may be implemented as a toolbar button 514 incorporated within a typical web browser toolbar 516. In this case, a user may activate a function of the AutoFill feature by selecting toolbar button 514 on browser toolbar 516. According to yet another implementation, the AutoFill feature may be implemented as a menu item (not shown) within a menu 518 (e.g., a "Tools" menu) of a web browser window. In this case, a user may activate a function of the AutoFill feature by selecting the menu item within menu 512. In still another implementation, the AutoFill feature may be implemented as an "auto-complete" feature in each fillable form element (e.g., form elements 504 and 506). That is, upon entry of at least one character in a form element, AutoFill information matching the initial character (or characters if more than one character has been received) may be automatically inserted into the form element. Alternative, a drop down listing of matching elements may be provided for selection by the user. It should be appreciated to those skilled in the art that in yet other implementations, other mechanisms—which may or may not be integrated within a web browser—for providing functionality of the AutoFill feature described herein may be used without departing from the spirit of the present invention.

As will be discussed in additional detail below, the AutoFill feature may be of particular utility on forms-based web documents, such as web document 502. As illustrated in FIG. 5, web document 502 may be a forms-based web document, such as an order form, a web log (i.e., "blog") entry or comment submission document, a message board submission document, a sign-up document, a check-out document associated with a web retailer, etc. In practice, any web document capable of receiving textual information from a user may be subject to improvements consistent with principles of the invention. As discussed briefly above, current autofill technologies identify fillable form elements by comparing a predetermined mapping of user information types or names to form element names or identifiers as present in the underlying markup language (e.g., html, xml, etc.) of web document 502. Unfortunately, known autofill software is unable to properly fill form elements in web documents having non-standard on unknown form field element identifiers or compound form elements (i.e., elements having multiple pieces of information therein).

Figure 6:
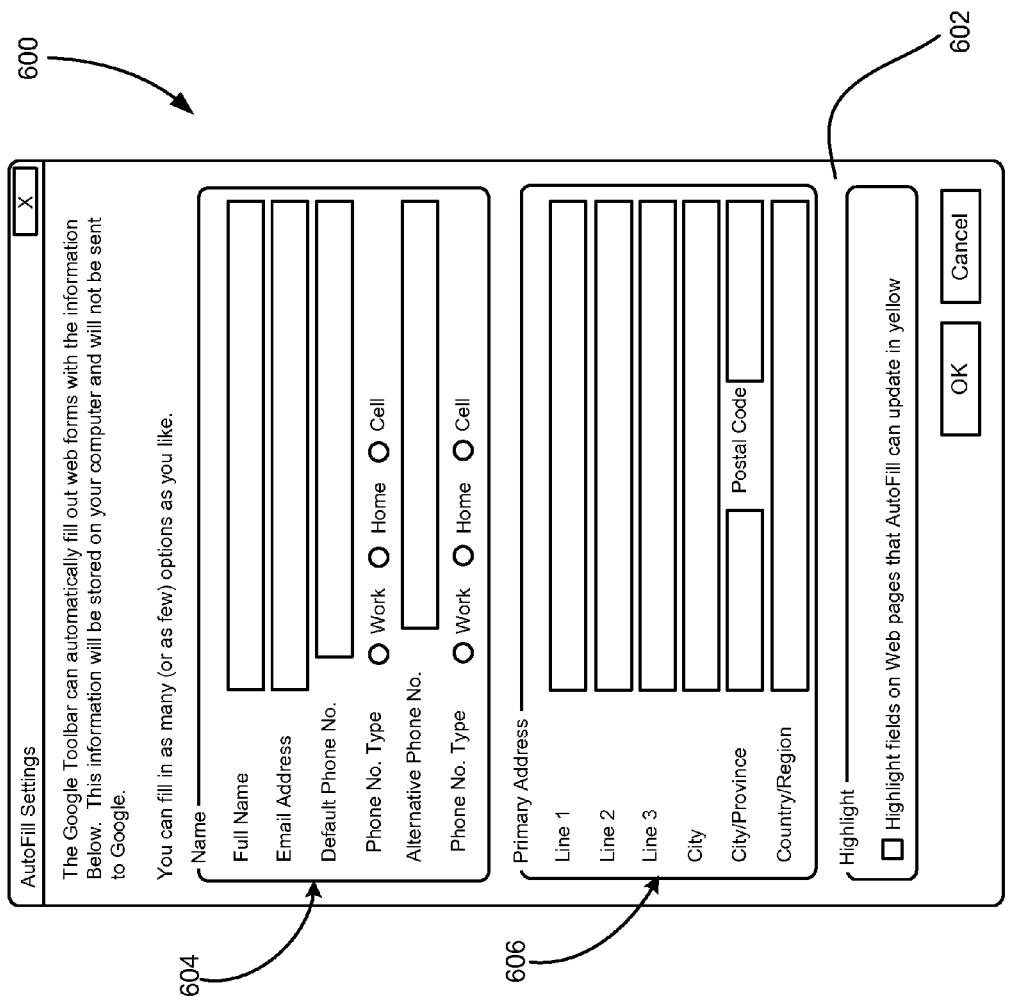
FIG. 6 is an exemplary diagram of a graphical user interface for receiving user submitted AutoFill information.

FIG. 6 is an exemplary diagram of a graphical user interface 600 for receiving user submitted AutoFill information. Graphical user interface 600 may, for example, correspond to a web browser window or pop-up window 602 for receiving AutoFill settings and that is displayed in response to a first instance of a web form document in the web browser. Alternatively, graphical interface 600 may be presented to the user in response user selection of an AutoFill settings option in a menu (not shown) of tool bar 510.

As shown, window 602 may include a name area 604 for receiving identification information from the user. Further, window 602 may include a primary address area 606 for receiving location information from the user. As noted in window 602, users may submit desired information into areas 604 and 606 and need not fully complete each entry field. Upon subsequent visits to web documents having identifiable form elements, AutoFill software 430 may attempt to insert information received into window 602 into appropriate form elements. Areas 604 and 606 as shown include only exemplary information. It should be understood that any type of information may be received and stored for subsequent insertion into identifiable web form fields.

FIG. 7 is an exemplary table 700 illustrating a mapping of received user information to a corresponding listing of attribute names. Information received from the user in window 602 may be stored as attributes values 702 in table 700, while corresponding attribute names may be stored in column 704. Each attribute name may be used to designate or describe form entry elements in web documents. Upon access to a web document having one or more form entry elements, table 700 may be queried to determine what information to insert into the document, upon user selection of the AutoFill feature.

Exemplary Processing

Figure 8:
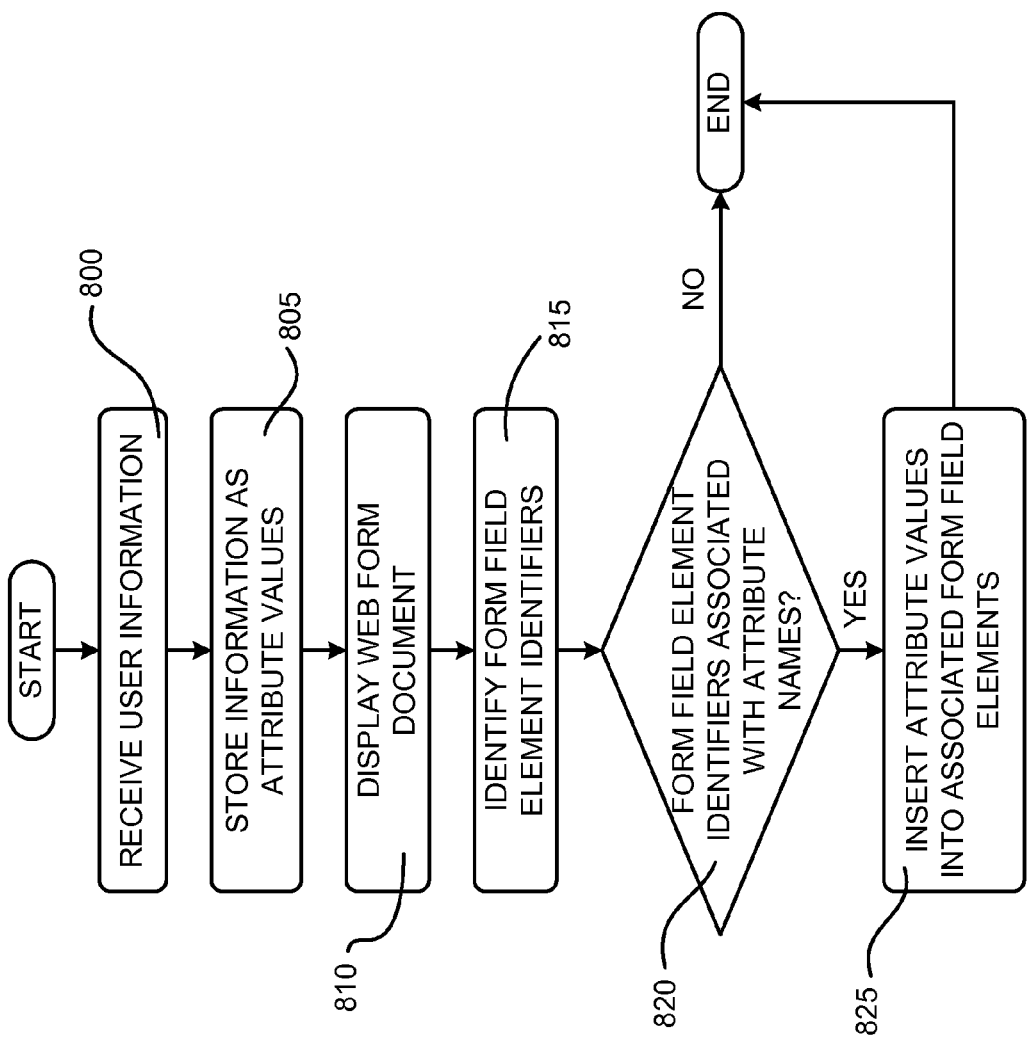
FIG. 8 is a flowchart of an exemplary process for implementing an AutoFill feature.

FIG. 8 is a flowchart of an exemplary process for implementing an AutoFill feature. The processing of FIG. 8 may be performed by one or more software and/or hardware components within client 210, server 220, or a combination of client 210 and server 220. In another implementation, the processing may be performed by one or more software and/or hardware components within another device or a group of devices separate from or including client 210 and/or server 220.

Processing may begin with receipt of user information into window 602 (block 800) and storage of the received information as attribute values 702 in table 700 (block 805). This initial data entry may form the basis of the user's AutoFill experience. As described above, known autofill functionality is limited to inserting user attributes into identified form field elements in a web document based only on a static correlation between the form field element identifiers used in the web document (e.g., identifiers used in the underlying markup language of the document) and attribute information stored for those identifiers in table 700. That is, the correlation between form field element identifiers 704 and received attributes 702 is predetermined and static across all web documents. As will be described below, aspects of the invention facilitate dynamic or unlimited correlations between received user data and form field elements, thereby substantially increasing the accuracy and quality of inserted information.

Returning to FIG. 8, once one or more attributes have been received, a web document having one or more form field elements may be displayed to the user (block 810). As is known in the art, the web document is typically received from a server address designated by a uniform resource locator (URL) selected or entered by the user. Web documents having form elements thereon typically also include or designate a target URL to which any information received in the form elements is transmitted. Form field element identifiers may then be identified for each form field element in the web document (block 815). For example, a first form field element may have an identifier, such as "element_1", or "answer 1", or "complete name", etc. It may then be determined whether the identified form field element identifiers associated with the web document URL and possibly the web document's target URL have been associated with attribute names 704 in table 700 (block 820). If so, the attribute values associated with the identified attribute names may be inserted into appropriate form field elements in the web document (block 825). In one aspect, the determination made in block 820 may be made remotely from client 210 (e.g. at server 220). For example, add-on toolbar 510 may query AutoFill engine 225 on remote server 220 for attribute names associated with the identified form field element identifiers for the particular web document (e.g., based on a URL and target URL associated with the web document).

Figure 9:
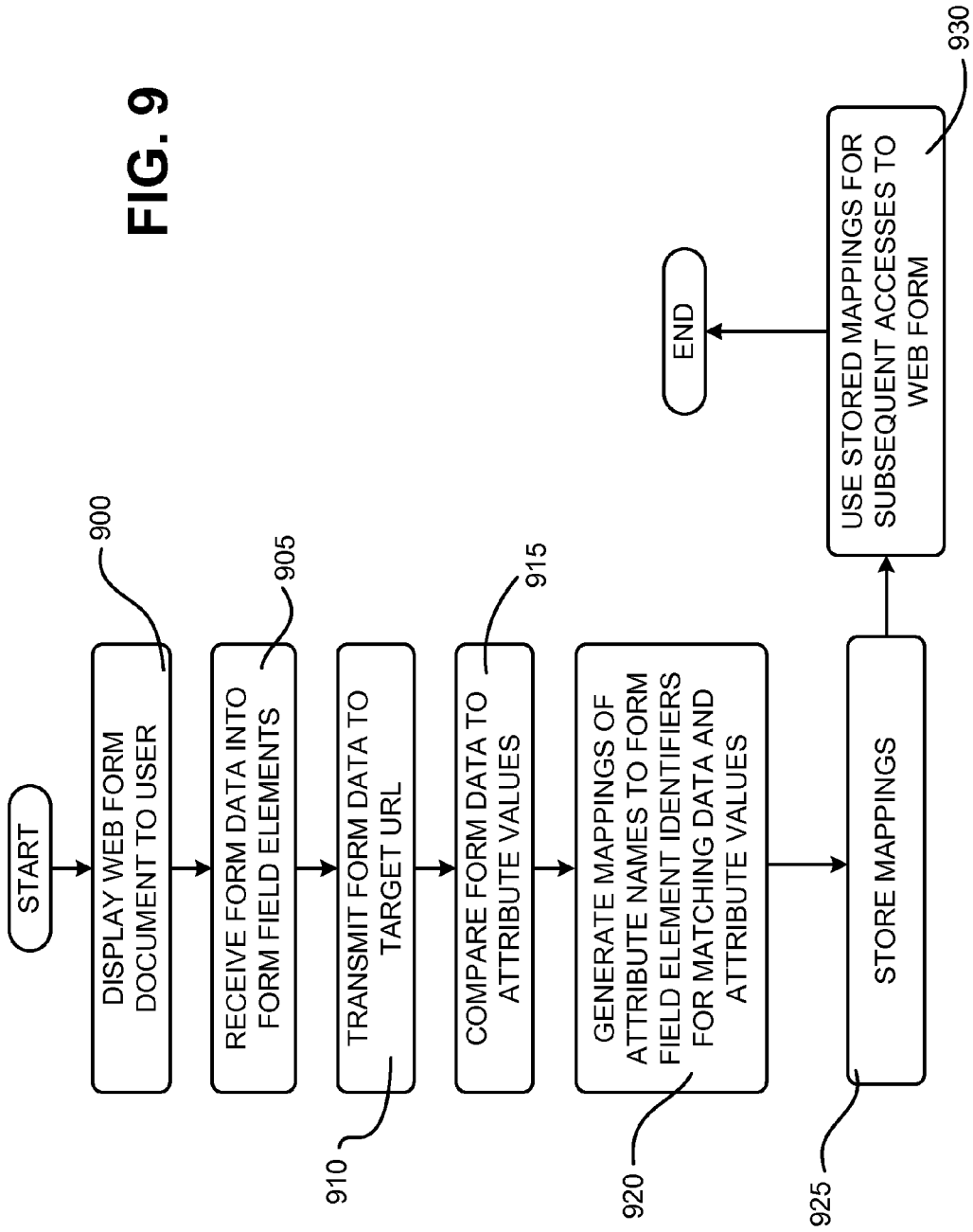
FIG. 9 is a flowchart of an exemplary process for determining form field identifier to attribute name associations.

FIG. 9 is a flowchart illustrating an exemplary process for determining form field identifier to attribute name associations. In one aspect, processing may begin upon display of the web form document to a user (block 900). As noted above, the form document may include a URL and a target URL and each form field element on the web document may have at least one identifier. In some instances, the identification of form field elements may simply be a numerical progression of form field elements in the document. In other implementations, each form field element may have a unique name or identifier associated therewith. Initially, it should be understood that no defined correlation between form field elements in the document and user attribute values may be made at this point. Form data may be received from the user into a number of form field elements in the web document (block 905). The form data may be transmitted to the target URL upon receipt of a request to submit the form data (block 910).

The form data entered by the user may be compared to the attribute values previously entered by the user (e.g., entered in window 602) (block 915). For received form data matching received user attributes, a mapping of attribute name to form field identifier may be made (block 920). For example, the web document may include a form field element having a markup language or form field identifier of "user data 1". Upon display of the document to the user, the user may enter "John" which matches the attribute value associated with the attribute name "first name" in table 700. Accordingly, a mapping of the form field identifier "user data 1" to the attribute name "first name" may be made for this form field in the web document. This mapping may then be stored (e.g., at server 220) (block 925). The stored mapping may be used in determining whether the identified form field element identifiers associated with the web document have been associated with attribute names for subsequent displays of the web document for either the same or different users (block 930).

In additional implementations, the creation of dynamic mappings of web document form field identifiers to attribute names enables operation of AutoFill feature on compound form fields, or form fields requesting information associated with more than one attribute name. For example, a web document having a form field element identified by "answer 1" may elicit a user entry of "John Doe". In comparing the user entry with the content of table 700, it may be determined that form field element "answer 1" corresponds to a compound attributes name of "first name, last name". This mapping may be stored.

Although the above-described functionality may be extremely useful in a solely local implementation (e.g., where the mapping information is useful only to a single client 210), a networked implementation may provide additional benefits. FIG. 10 is a flowchart illustrating exemplary processing for implementing a networked AutoFill feature. Processing may begin upon receipt of at least one mapping identified in block 920 by AutoFill engine 225 (block 1000). The web document associated with the at least one mapping may be displayed to a client 210. Client 210 may be different or the same as client 210 that submitted the original mapping information.

Form field element identifiers may then be identified for each form field element in the web document (block 1005). Upon form field element identification, AutoFill software 430 on client 210 may query AutoFill engine 225 on server 220 and determine whether any mappings between the identified form field element identifiers for the web document and one or more attribute names have been previously stored (block 1010). In one embodiment, this determination may be based on a statistical analysis of received mapping information. For example, prior to indicating a defined mapping to AutoFill software 430, AutoFill engine 225 may require that a predetermined number of similar or substantially similar mappings be received. Additionally, AutoFill engine 225 may require a predetermined confidence level for a identified mapping. For example, prior to indicating a mapping to AutoFill software 430, AutoFill engine 225 may require that 75% of all received mappings match the indicated mapping. Such a confidence interval or other statistical analysis, ensures that infrequently visited web documents or erroneously entered data does not unnecessarily skew the identified mappings, thereby resulting in incorrect data insertions.

Any identified mappings may be transmitted to AutoFill software 430 (block 1015). A user request to AutoFill the form field elements may be received (block 1020). User attribute values associated with the mapped attribute names may be inserted into appropriate form field elements in the web document (block 1025). A user request to submit the form field elements to the target URL may be received (block 1030). Upon submission of the form data, the submitted form data may be compared to the previously stored attribute values (block 1035). Mappings between the received form data and attribute names associated with any matching attribute values may be made and transmitted to AutoFill engine 225 for inclusion in the statistical veracity calculations for the web document (block 1040).

CONCLUSION

Systems and methods consistent with the aspects of the invention may provide a forms autofill feature for automatically inserting stored user data into form entry fields in web documents. As described above, previously submitted form field data may be used to generate mappings between the web document form fields and the stored user data, thereby facilitating accurate entry of user data in subsequent visits to the web document.

The foregoing description of preferred embodiments of the present invention provides illustration and description, but is not intended to be exhaustive or to limit the invention to the precise form disclosed. Modifications and variations are possible in light of the above teachings or may be acquired from practice of the invention.

For example, while series of acts have been described with regard to FIGS. 8, 9, and 10, the order of the acts may be modified in other implementations consistent with the principles of the invention. Further, non-dependent acts may be performed in parallel.

Also, exemplary user interfaces have been described with respect to FIGS. 5 and 6. In other implementations consistent with the principles of the invention, the user interfaces may include more, fewer, or different pieces of information.

The preceding description refers to a user. A "user" is intended to refer to a client, such as a client 210 (FIG. 2), or an operator of a client 210.

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the invention. Thus, the operation and behavior of the aspects were described without reference to the specific software code—it being understood that one of ordinary skill in the art would be able to design software and control hardware to implement the aspects based on the description herein.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
   determining, by one or more processors, a mapping of a plurality of previously received attribute values to a plurality of form field identifiers,
     each form field identifier, of the plurality of form field identifiers, identifying a field of a form contained in a first document;
   determining, by the one or more processors, a confidence value for the mapping by:
     identifying a quantity of the plurality of form field identifiers,
     identifying a quantity of the plurality of previously received attribute values,
     determining a difference between the identified quantity of the plurality of form field identifiers and the identified quantity of the plurality of previously received attribute values, and
     determining the confidence value based on the determined difference; and
   inserting, by the one or more processors, at least one of the plurality of previously received attribute values into a second document based on the mapping when the confidence value is at least equal to a threshold value associated with a minimum acceptable confidence value.

2. The method of claim 1, further comprising:
   storing the mapping in association with a form filling function when the confidence value is at least equal to the threshold value.

3. The method of claim 1, further comprising:
   determining previously received mappings of other attribute values to at least one of the plurality of form field identifiers; and
   determining the confidence value for the mapping based on the previously received mappings.

4. The method of claim 3, where the plurality of previously received attribute values are associated with a first user and at least one of the other attribute values is associated with a second user that is different from the first user.

5. The method of claim 1, where the first document is associated with a network address, the method further comprising:
   associating the mapping with the network address when the confidence value is at least equal to the threshold value.

6. The method of claim 1, where the field of the form is associated with a target network address, the method further comprising:
   associating the mapping with the target network address when the confidence value is at least equal to the threshold value.

7. The method of claim 1, where the plurality of previously received attribute values are associated with a particular user, the method further comprising:
   storing the mapping when the confidence value is at least equal to the threshold value;
   determining that the particular user is accessing a second field of a second form contained in the second document, the second field being identified by a form field identifier of the plurality of form field identifiers;
   retrieving the mapping based on the second field being identified by the form field identifier; and
   inserting an attribute value, of the plurality of previously received attribute values, into the second field based on the mapping.

8. A non-transitory computer-readable medium storing instructions, the instructions comprising:
   one or more instructions that, when executed by one or more processors, cause the one or more processors to:
     determine a mapping of a plurality of previously received attribute values to a plurality of form field identifiers,
       each form field identifier, of the plurality of form field identifiers, identifying a field of a form contained in a first document,
     determine a confidence value for the mapping,
       the one or more instructions to determine the confidence value for the mapping including:
         one or more instructions to identify a quantity of the plurality of form field identifiers,
         one or more instructions to identify a quantity of the plurality of previously received attribute values,
         one or more instructions to determine a difference between the identified quantity of the plurality of form field identifiers and the identified quantity of the plurality of previously received attribute values, and one or more instructions to determine the confidence value based on the determined difference, and insert at least one of the plurality of previously received attribute values into a second document based on the mapping when the confidence value is at least equal to a threshold value associated with a minimum acceptable confidence value.

9. The non-transitory computer-readable medium of claim 8, where the instructions further comprise:
one or more instructions to:
store the mapping in association with a form filling function when the confidence value is at least equal to the threshold value.

10. The non-transitory computer-readable medium of claim 8, where the instructions further comprise:
one or more instructions to:
determine previously received mappings of other attribute values to at least one of the plurality of form field identifiers, and
determine the confidence value for the mapping based on the previously received mappings.

11. The non-transitory computer-readable medium of claim 10, where the plurality of previously received attribute values are associated with a first user and at least one of the other attribute values is associated with a second user that is different from the first user.

12. The non-transitory computer-readable medium of claim 8, where the first document is associated with a network address, and the instructions further comprise:
one or more instructions to:
associate the mapping with the network address when the confidence value is at least equal to the threshold value.

13. The non-transitory computer-readable medium of claim 8, where the field of the form is associated with a target network address, and the instructions further comprise:
one or more instructions to:
associate the mapping with the target network address when the confidence value is at least equal to the threshold value.

14. The non-transitory computer-readable medium of claim 8, where the plurality of previously received attribute values are associated with a particular user, and the instructions further comprise:
one or more instructions to:
store the mapping when the confidence value is at least equal to the threshold value,
determine that the particular user is accessing a second field of a second form contained in the second document,
the second field being identified by a form field identifier of the plurality of form field identifiers,
retrieve the mapping based on the second field being identified by the form field identifier, and
insert an attribute value, of the plurality of previously received attribute values, into the second field based on the mapping.

15. A system comprising:
one or more devices to:
determine a mapping of a plurality of previously received attribute values to a plurality of form field identifiers,
each form field identifier, of the plurality of form field identifiers, identifying a field of a form contained in a first document,
determine a confidence value for the mapping,
the one or more devices, when determining the confidence value for the mapping, being to:
identify a quantity of the plurality of form field identifiers,
identify a quantity of the plurality of previously received attribute values,
determine a difference between the identified quantity of the plurality of form field identifiers and the identified quantity of the plurality of previously received attribute values, and
determine the confidence value based on the determined difference, and
insert at least one of the plurality of previously received attribute values into a second document based on the mapping when the confidence value is at least equal to a threshold value associated with a minimum acceptable confidence value.

16. The system of claim 15, where the one or more devices are further to:
store the mapping in association with a form filling function when the confidence value is at least equal to the threshold value.

17. The system of claim 15, where the one or more devices are further to:
determine previously received mappings of other attribute values to at least one of the plurality of form field identifiers, and
determine the confidence value for the mapping based on the previously received mappings,
the plurality of previously received attribute values being associated with a first user and at least one of the other attribute values being associated with a second user that is different from the first user.

18. The system of claim 15, where the first document is associated with a network address, and
where the one or more devices are further to:
associate the mapping with the network address when the confidence value is at least equal to the threshold value.

19. The system of claim 15, where the field of the form is associated with a target network address, and
where the one or more devices are further to:
associate the mapping with the target network address when the confidence value is at least equal to the threshold value.

20. The system of claim 15, where the plurality of previously received attribute values are associated with a particular user, and
where the one or more devices are further to:
store the mapping when the confidence value is at least equal to the threshold value,
determine that the particular user is accessing a second field of a second form contained in the second document,
the second field being identified by a form field identifier of the plurality of form field identifiers, and
retrieve the mapping based on the second field being identified by the form field identifier, where an attribute value, of the plurality of previously received attribute values, is inserted into the second field based on the mapping.

* * * * *